(12) United States Patent  
Peterson et al.

(10) Patent No.: US 6,234,542 B1  
(45) Date of Patent: May 22, 2001

(54) EXPANSION JOINT FOR A FLUID PIPING SYSTEM

(75) Inventors: Michael J. Peterson, Nashville; Richard M. Russell, Brentwood, both of TN (US)

(73) Assignee: Dialysis Systems, Inc., Nashville, TN (US)

( * ) Notice: Subject to any disclaimer, the term of this patent is extended or adjusted under 35 U.S.C. 154(b) by 0 days.

(21) Appl. No.: 09/267,537

(22) Filed: Mar. 12, 1999

(51) Int. Cl.[7] .................................... F16L 55/02  
(52) U.S. Cl. ............................. 285/226; 285/299  
(58) Field of Search .................... 285/226, 299, 285/300, 301

(56) References Cited

U.S. PATENT DOCUMENTS

| | | | |
|---|---|---|---|
| 1,993,984 | * 3/1935 | Wulle et al. | 285/299 |
| 2,151,911 | * 3/1939 | Green et al. | 285/301 |
| 2,406,234 | * 8/1946 | Marancik et al. | 285/299 |
| 2,771,311 | * 11/1956 | Hottenroth, Jr. | 285/299 |
| 2,867,242 | * 1/1959 | Harris et al. | 285/301 |
| 2,930,116 | * 3/1960 | Minges | 285/226 |
| 3,019,037 | * 1/1962 | Caldwell | 285/226 |
| 3,219,365 | * 11/1965 | Webb | 285/226 |
| 3,369,829 | 2/1968 | Hopkins . | |
| 3,837,685 | * 9/1974 | Miller | 285/300 |
| 4,027,902 | * 6/1977 | Tanikawa | 285/226 |
| 4,350,372 | 9/1982 | Logsdon . | |
| 5,437,479 | * 8/1995 | Hartling et al. | 285/300 |
| 5,538,294 | 7/1996 | Thomas . | |
| 5,720,504 | 2/1998 | Stedman et al. . | |
| 5,769,463 | 6/1998 | Thomas . | |
| 5,803,506 | 9/1998 | Argersinger et al. . | |
| 5,813,704 | 9/1998 | Naito . | |

FOREIGN PATENT DOCUMENTS

| | | | |
|---|---|---|---|
| 2150149 | * 8/1972 | (DE) | 285/299 |
| 2809120 | * 10/1978 | (DE) | 285/300 |
| 181604 | * 11/1962 | (SE) | 285/299 |

OTHER PUBLICATIONS

Brochure entitled "Quadra–Side High Pressure Expansion Compensators" (undated, but admitted to be prior art).

* cited by examiner

Primary Examiner—Eric K. Nicholson  
(74) Attorney, Agent, or Firm—Waddey & Patterson

(57) ABSTRACT

An expansion joint for a fluid piping system is described. The expansion joint is formed of a corrugated cylindrical bellows constrained by a linear sheath within which the expansion joint can contract as the ends of adjacent pipes move closer together due to heat expansion.

15 Claims, 2 Drawing Sheets

EXPANSION JOINT FOR A FLUID PIPING SYSTEM

BACKGROUND OF THE INVENTION

The present invention relates generally to fluid piping systems. More particularly, this invention pertains to expansion joints for relieving heat expansion stress in a fluid piping system.

It will be appreciated by those of skill in the art that fluid piping systems designed to transport fluids in settings such as dialysis clinics, research laboratories, certain manufacturing facilities and food processing plants must be periodically disinfected.

The prior art fluid piping systems, with multiple solvent-welded joints and cavities which are relatively inaccessible for disinfection provide a suitable environment for growth of a number of pathogenic microorganisms, such as Pseudomonas species. The inventors have described, in U.S. patent application Ser. No. 09/206,904, for a "System for Fluid Delivery in a Dialysis Clinic," filed Dec. 7, 1998, the details of which are incorporated herein by reference, a novel fluid piping system which minimizes the recessed surfaces where bacteria may freely grow. However, since Pseudomonas, particularly, can grow along internal surfaces of a tube filled with sterile water, periodic disinfection of the piping system is required.

Currently, disinfection of fluid piping systems in health care clinics, particularly dialysis clinics, utilizes a combination of chemical and high temperature disinfection means. The high temperatures required for heat disinfection of conventional systems place considerable expansion stress on the piping systems. Chemical disinfectants are therefore used to allow heat disinfection temperatures to be decreased.

Chemical disinfectants, however, provide an added risk to patients in a dialysis clinic. Formaldehyde, for example, may cross dialysis membranes to enter the patient's bloodstream and stimulate antibodies to the patient's own DNA. Therefore, a more acceptable disinfection program would provide disinfection using heat alone.

What is needed, then, is a component for a fluid piping system that would facilitate heat disinfection by reducing expansion stress within a fluid piping system exposed to high temperatures for prolonged periods of time and capable of repeated cycling without compromising the integrity of the expansion compensating component.

SUMMARY OF THE INVENTION

An expansion joint is provided for connecting pipes in a fluid piping system. The expansion joint is particularly designed to reduce heat expansion stress in a fluid piping system.

The expansion joint includes a cylindrical bellows connected between pipes in the fluid piping system. Also included is a sheath enclosing the cylindrical bellows. During heat disinfection, distortion of the cylindrical bellows is limited by the sheath, while the lack of fixed attachment of the sheath allows the couplings connecting the expansion joint to the adjacent pipes in the fluid piping system to freely slide towards each other as the pipes expand due to heat expansion.

The cylindrical bellows is preferably formed of corrugated polymer tubing. In a preferred embodiment of the invention, the bellows is formed of a corrugated polytetrafluoroethylene tube that is stable at a temperature of 105 degrees Celsius applied for a period of at least 20 hours.

Couplings at the ends of the corrugated bellows provide connectors for attachment to complementary couplings at the ends of adjacent pipes in the fluid piping system.

In a preferred embodiment, the couplings allow replacement of the expansion joint, most preferably by providing threaded connections that can be easily installed and removed.

Installation of the removable sheath is accomplished by fitting the sheath over the length of the corrugated bellows and adjacent couplings, facilitated by a lengthwise split in the sheath. The sheath is preferably formed of polymer tubing.

An object of the present invention is to provide a means to reduce heat expansion stress in a fluid piping system. Another object of the invention is to provide a component of a fluid piping system which facilitates the use of high temperatures for prolonged periods of time during heat disinfection.

DESCRIPTION OF THE PREFERRED EMBODIMENTS

The present invention provides a component of a fluid piping system that reduces heat expansion stress in a fluid piping system and thereby facilitates heat disinfection and eliminates the need for chemical disinfectants during the heat disinfection process.

Figure 1:
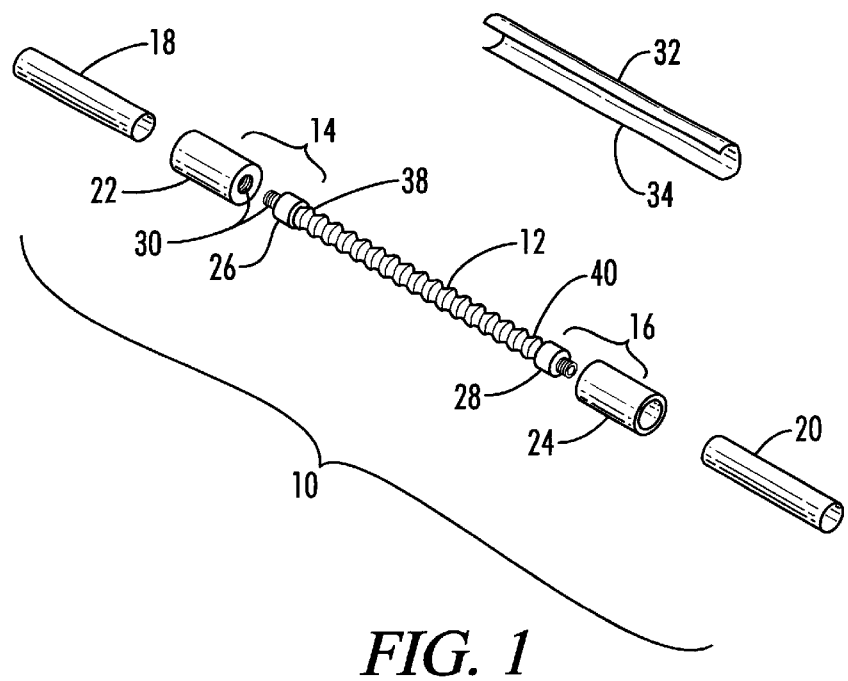
FIG. 1 is an exploded view of the expansion joint of the present invention.

To overcome the shortcomings in the prior art for a piping system which can be heat disinfected for transporting fluid in the health care facility, the inventors have created an expansion joint 10, the assembly of which is illustrated in FIG. 1, for connecting first 18 and second 20 lengths of piping in the system. As shown in FIG. 1, the expansion joint comprises a cylindrical bellows 12 with first 14 and second 16 couplings connecting the bellows 12 to the first 18 and second 20 lengths of piping respectively. The first coupling 14 is formed of a cylindrical pipe coupling member 22 fused to the first pipe 18 and a cylindrical bellows coupling member 26 fused to the bellows 12.

A further component of the expansion joint 10 is a sheath 32 received about the bellows 12 and slidably engaging each of the first 14 and second 16 couplings so that when the pipes 18 and 20 expand longitudinally and the bellows 12 compresses, the sheath 32 will slide over at least one of the first 14 and second 16 couplings.

In a preferred embodiment, the sheath 32 is a lengthwise rigid continuous member extending from the first coupling 14 to the second coupling 16. The sheath 32 further comprises a cylindrical member having a lengthwise split 34 defined therein so that the sheath is radially flexible, allowing it to flexibly grip the first 14 and second 16 couplings. Furthermore, in the expansion joint 10 described herein, the sheath 32 preferably has a length greater than five times its diameter. The radial flexibility provided by the lengthwise split 34 allows the sheath to be placed over and around the cylindrical bellows 12 so that the sheath flexibly grips the first 14 and second 16 couplings.

In a preferred embodiment of the invention, the bellows 12, the couplings 14 and 16, and the sheath 32 are all constructed of plastic material. The bellows 12, the couplings 14 and 16, and the sheath 32 are most preferably constructed of a heat-resistant hydrocarbon polymer, the cylindrical bellows being formed of a length of corrugated tubing. In a particular preferred embodiment, the cylindrical bellows is composed of the heat resistant polymer polytetrafluoroethylene (PTFE), also known by the commercial name Teflon® (Dupont).

Figure 2:
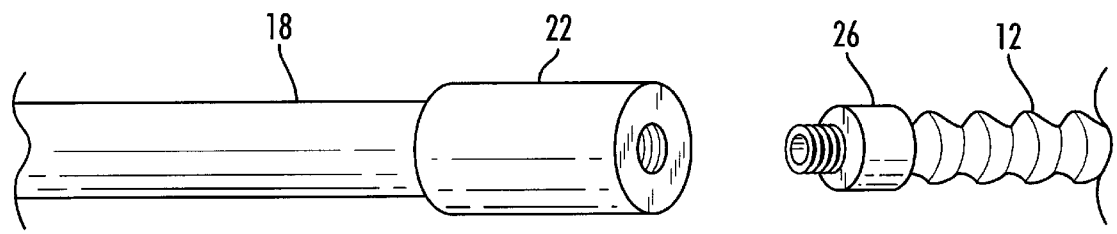
FIG. 2 illustrates the method of connection of the removable coupling members of the coupling of the present invention.

As shown in FIG. 2, first pipe coupling member 22 and first bellows coupling member 26 can be connected in a detachable manner by forming the first pipe coupling member 22 as a female-threaded fitting and forming the first bellows coupling member 26 as a male-threaded fitting, so that the connection can be made when the male-threaded bellows coupling member 26 is threadably received into the female-threaded pipe coupling member 22. In a preferred embodiment of the invention, the first pipe coupling member 22 has an outside diameter greater than an outside diameter of the first bellows coupling member 26. In an alternate embodiment of the invention, couplings 14 and 16 can be formed of quick-connect fittings, such as those described and illustrated in U.S. patent application Ser. No. 09/206,904.

Figure 3:
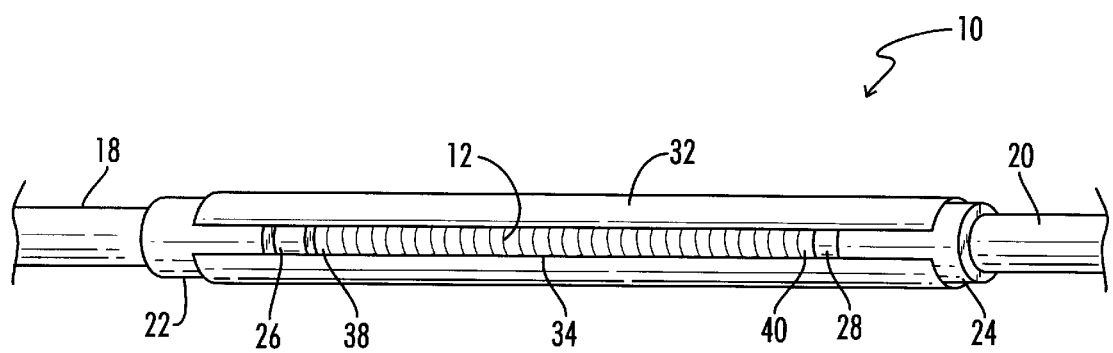
FIG. 3 is an enlarged view of the assembled expansion joint.

As illustrated in FIG. 3, the present invention provides an expansion coupling 10 connecting an end of a first pipe 18 in a fluid piping system and an end of a second pipe 20 in a fluid piping system. A cylindrical bellows 12 having a first end 38 and a second end 40, is fluidly connected to first pipe 18 and second pipe 20. The fluid connection is achieved by connecting a first bellows coupling member 26, attached to the first end 38 of the cylindrical bellows 12, to a first pipe coupling member 22, attached to the end of the first pipe 18, and connecting a second bellows coupling member 28, attached to the second end of the cylindrical bellows 12, to a second pipe coupling member 24, attached to the end of the second pipe 20. Attachment of bellows coupling members 26 28 to bellows ends 38 40, respectively, and attachment of pipe coupling members 22 and 24 to the ends of pipes 18 and 20, respectively, can be accomplished by fusing the coupling members to the corresponding ends of the pipe or bellows. The first end of a sheath 32 is received over the first pipe coupling member 22 and a second end of the sheath 32 is received over the second pipe coupling member 24 by means of a lengthwise split 34 in the sheath which gives the sheath radial flexibility. In the expansion joint 10 and expansion coupling 10 of the present invention, the cylindrical bellows 12 is formed of corrugated tubing which is stable at a temperature of 105 degrees Celsius applied for a period of at least twenty hours, the time and temperature requirement being mandated by acceptable standard disinfection conditions for fluid piping systems in a health-care facility.

It will be appreciated by those of skill in the art that fluid piping systems used to transport purified fluids must be periodically disinfected to reduce bacterial contamination. Standard disinfection methods requiring only the application of heat are preferable to those disinfection methods that require a combination of heat and chemicals, since the use of chemical disinfectants poses associated risks. Standard heat disinfection methods, however, require the use of high temperatures for prolonged periods and repeated heat disinfection cycles. Exposure to high temperatures for the prolonged periods of time necessary for heat disinfection places considerable heat stress on the piping system and repeated cycling may result in low cycle stress fatigue failure. Therefore, in the method of the present invention, thermal expansion stress in a fluid piping system is reduced during application of heat sufficient to produce temperatures above 100 degrees Celsius for prolonged periods of time. Reduction of thermal expansion stress as described by this method is accomplished by connecting a first pipe 18 and a second pipe 20 to the piping system. To the first pipe 18 is connected a first end of a cylindrical bellows 38 and to second pipe 20 of the piping system is connected a second end of the cylindrical bellows 40 by means previously described. The fluid within the system is heated to a temperature of at least 105 degrees Celsius for a period of at least twenty hours in order to accomplish heat disinfection of the system as prescribed by industry standards. Heating fluid within the system to the required temperature produces longitudinal expansion of the first pipe 18 and the second pipe 20. Longitudinal expansion of the first 18 and second 20 pipes respectively, results in compression of the cylindrical bellows 12 along its length. Since heat expansion may cause longitudinal expansion of the cylindrical bellows 12 itself with resulting deformation, the cylindrical bellows 12 is housed within a sheath 32 to reduce the deformation of the bellows as heat is applied to the system.

The present invention also describes a method of using heat disinfection, without application of chemical disinfectants, to reduce bacterial contamination in a fluid piping system. In the method of disinfection, a cylindrical bellows 12 as shown in FIG. 3 is fluidly connected between a first pipe 18 and a second pipe 20 within a fluid piping system. A sheath 32 is placed over the cylindrical bellows 12 to reduce deformation of the bellows 12 when sufficient heat is applied to the piping system to accomplish disinfection. Fluid or gag within the fluid piping system is heated to a temperature of at least 105 degrees Celsius, and applied to the system for a period of at least 20 hours, as prescribed by accepted standards. First pipe 18 and second pipe 20 are expanded, causing the cylindrical bellows 12 to compress within the sheath 32 which has been placed over and around the bellows 12 to restrict deformation of the bellows.

Figure 4:
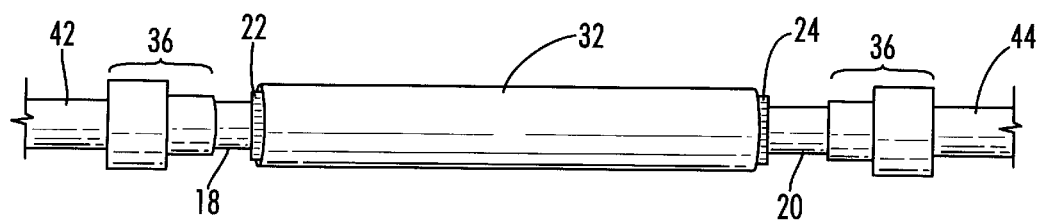
FIG. 4 illustrates the completed installation of the expansion joint of the present invention in a fluid piping system, such as that described by U.S. patent application Ser. No. 09/206,904, for a "System for Fluid Delivery in a Dialysis Clinic," filed Dec. 7, 1998.

A particular feature of the present invention involves a removable connection of the bellows to the end of the pipe as shown in FIG. 2. In FIG. 2 the bellows coupling member 26 is shown as male-threaded coupling member attached to the cylindrical bellows 12. Pipe coupling member 22 is shown as a female-threaded coupling member attached to first pipe 18. A male-threaded coupling member 26 is threadably received into the female-threaded coupling member 22, which has a diameter greater than that of the bellows coupling member 26. A removable connection is accomplished as the bellows coupling member 26 is threadably received within the pipe coupling member 22. The expansion joint 10 of the present invention can be used in a modular fluid piping system, such as that described in U.S. patent application Ser. No. 09/206,904, since threaded coupling members 26 and 28 attached to the cylindrical bellows 12 facilitate interchangeable installation of a cylindrical bellows 12 within the system. The sheath 32 enclosing the cylindrical bellows 12 is also removable by means of the lengthwise split 34 and radial flexibility produced thereby. Pipe unions 36, as shown in FIG. 4, utilized in a modular piping system, such as that described in U.S. patent application Ser. No. 09/206,904, facilitate installation of adjoining piping segments within the system, and facilitate installation and removal of the interchangeable cylindrical bellows 12 by allowing the bellows 12 to be threaded into the adjoining pipe segments 18 and 20 before the pipe segments are locked into place by attachment to pipe segments 42 and 44, respectively, by the unions 36.

Thus, although there have been described particular embodiments of the present invention of a new and useful "Expansion Joint for a Fluid Piping System," it is not intended that such references be construed as limitations upon the scope of this invention except as set forth in the following claims.

What is claimed is:

1. An expansion joint for connecting first and second lengths of piping, comprising:
   a bellows;
   first and second couplings connecting the bellows to the first and second lengths of piping, respectively;
   a sheath received about the bellows and slidably engaging each of the first and second couplings, so that when the pipes expand and the bellows compresses the sheath will slide over at least one of the first and second couplings; and
   wherein the sheath is a lengthwise rigid continuous member extending from the first coupling to the second coupling, and wherein the sheath is a cylindrical member having a lengthwise split defined therein so that the sheath is radially flexible, allowing it to flexibly grip the first and second couplings.

2. The expansion joint of claim 1, wherein the sheath has a length greater than five times its diameter.

3. An expansion joint for connecting first and second pipes, comprising:
   a bellows;
   first and second couplings connecting the bellows to the first and second pipes; and
   a cylindrical sheath having a split along its length so that the sheath is radially flexible, the sheath being received about and flexibly gripping the first and second couplings.

4. The expansion joint of claim 3, wherein the sheath has a length greater than five times an outside diameter of the bellows.

5. The expansion joint of claim 3, wherein the bellows, the couplings, and the sheath are all constructed of a plastic material.

6. An expansion coupling connecting an end of a first pipe and an end of a second pipe, comprising:
   a cylindrical bellows, having a first end and a second end;
   first and second pipe coupling members connected to the ends of the first and second pipes, respectively;
   a first bellows coupling member and a second bellows coupling member connected to the first end and the second end, respectively, of the cylindrical bellows, said first bellows coupling member being fluidly connected to the first pipe coupling member and said second bellows coupling member being fluidly connected to the second pipe coupling member; and
   a sheath enclosing the cylindrical bellows, a first end of the sheath being received over the first pipe coupling member and a second end of the sheath being received over the second pipe coupling member, wherein the sheath includes a length of tubing having a split along its length.

7. The expansion coupling of claim 6, wherein the cylindrical bellows further comprises corrugated tubing which is stable at a temperature of 105 degrees Celsius applied for a period of at least 20 hours.

8. The expansion coupling of claim 7, wherein the corrugated tubing further comprises a hydrocarbon polymer.

9. The expansion coupling of claim 7, wherein the corrugated tubing further comprises polytetrafluoroethylene.

10. The expansion coupling of claim 6, wherein each of the first and second pipe coupling members further comprise a threaded female connection connected to the first and second bellows coupling members, respectively.

11. The expansion coupling of claim 6, wherein each of the first and second bellows coupling members comprise a threaded male pipe fitting connected to the first and second pipe coupling members, respectively.

12. An expansion joint for a modular fluid piping system comprising:
   a) a pipe union connecting one of a first pipe and a second pipe to the piping system;
   b) first and second threaded pipe coupling members attached to the ends of the first and second pipes, respectively;
   c) an interchangeable cylindrical bellows, having first and second threaded bellows coupling members attached to a first end and a second end of the bellows, respectively; said first bellows coupling member being threadably received by the first pipe coupling member and said second bellows coupling member being threadably received by the second pipe coupling member; and
   d) a removable sheath enclosing the cylindrical bellows, wherein the removable sheath comprises a length of tubing having a split along its length.

13. The expansion joint of claim 12 wherein the cylindrical bellows comprises a length of polymer tubing.

14. An expansion joint for connecting first and second lengths of piping, comprising:
   a bellows;
   first and second couplings connecting the bellows to the first and second lengths of piping, respectively, wherein the first coupling includes:
      a cylindrical pipe coupling member attached to the first length of piping;
      a cylindrical bellows coupling member attached to the bellows;
      a detachable connection between the pipe coupling member and the bellows coupling member; and
      the pipe coupling member having an outside diameter greater than an outside diameter of the bellows coupling member; and
   a sheath received about the bellows and slidably engaging each of the first and second couplings, so that when the pipes expand and the bellows compresses the sheath will slide over at least one of the first and second couplings.

15. The expansion joint of claim 14, wherein the sheath engages the pipe coupling member of the first coupling.

* * * * *